(12) United States Patent
Matsueda et al.

(10) Patent No.: US 7,759,278 B2
(45) Date of Patent: Jul. 20, 2010

(54) EXHAUST GAS-PURIFYING CATALYST

(75) Inventors: Satoshi Matsueda, Kakegawa (JP); Mareo Kimura, Kakegawa (JP); Yoshinori Ishii, Kakegawa (JP); Naoto Miyoshi, Kakegawa (JP)

(73) Assignee: Cataler Corporation, Kakegawa-shi, Shizuoka (JP)

( * ) Notice: Subject to any disclaimer, the term of this patent is extended or adjusted under 35 U.S.C. 154(b) by 0 days.

(21) Appl. No.: 11/482,685

(22) Filed: Jul. 6, 2006

(65) Prior Publication Data

US 2006/0252638 A1  Nov. 9, 2006

Related U.S. Application Data

(63) Continuation of application No. PCT/JP2005/019590, filed on Oct. 25, 2005.

(30) Foreign Application Priority Data

Nov. 8, 2004  (JP) .............................. 2004-323886

(51) Int. Cl.
*B01J 23/00* (2006.01)
*B01J 23/10* (2006.01)
*B01J 23/58* (2006.01)
*B01J 23/42* (2006.01)
*B01J 23/44* (2006.01)

(52) U.S. Cl. ...................... 502/302; 502/304; 502/328; 502/339; 502/340

(58) Field of Classification Search ................. 502/302, 502/304, 328, 339, 340; 423/213.5, 213.7
See application file for complete search history.

(56) References Cited

U.S. PATENT DOCUMENTS 4,965,243 A * 10/1990 Yamada et al. ............... 502/304
5,128,306 A *  7/1992 Dettling et al. .............. 502/304

FOREIGN PATENT DOCUMENTS

| EP | 1099466 A1 * | 5/2001 |
|---|---|---|
| JP | 63-270544 | 11/1988 |
| JP | 64-058347 | 3/1989 |
| JP | 03-106446 | 5/1991 |
| JP | 05-168926 | 7/1993 |
| JP | 06-219721 | 8/1994 |
| JP | 06-075675 | 9/1994 |
| JP | 10-000358 | 1/1998 |
| JP | 2000-169148 | 6/2000 |
| JP | 2001-129399 | 5/2001 |
| JP | 2005-296759 | 10/2005 |

* cited by examiner

*Primary Examiner*—Steven Bos
*Assistant Examiner*—Anthony J Zimmer
(74) *Attorney, Agent, or Firm*—Morrison & Foerster LLP

(57) ABSTRACT

An exhaust gas-purifying catalyst includes a rare-earth element, an alkaline-earth element, and a precious metal. A part of the rare-earth element and a part of the alkaline-earth element form a composite oxide. The composite oxide and a part of the precious metal form a solid solution.

16 Claims, 3 Drawing Sheets

EXHAUST GAS-PURIFYING CATALYST

CROSS-REFERENCE TO RELATED APPLICATIONS

This is a Continuation Application of PCT Application No. PCT/JP2005/019590, filed Oct. 25, 2005, which was published under PCT Article 21(2) in Japanese.

This application is based upon and claims the benefit of priority from prior Japanese Patent Application No. 2004-323886, filed Nov. 8, 2004, the entire contents of which are incorporated herein by reference.

BACKGROUND OF THE INVENTION

1. Field of the Invention

The present invention relates to an exhaust gas-purifying catalyst.

2. Description of the Related Art

As an exhaust gas-purifying catalyst that treats exhaust gas of an automobile, a three-way catalyst with precious metal such as platinum supported by an inorganic oxide such as ceria or alumina has been widely used. In the three-way catalyst, the precious metal plays the role in promoting the reduction of nitrogen oxides and the oxidations of carbon monoxide and hydrocarbons. Further, the inorganic oxide plays the roles in increasing the specific surface area of the precious metal and suppressing the sintering of the precious metal by dissipating heat generated by the reactions. In particular, ceria has an oxygen storage capacity and is capable of optimizing the oxidation and reduction reactions.

In recent years, occasions when the automotive vehicle such as automobile is driven at high-speed increase as the performance of an engine increases. Additionally, in order to prevent pollution of the air, the regulations on the exhaust gas are made more stringent. Against these backdrops, temperature of the exhaust gas emitted by the automotive vehicle is on the trend of rising.

Further, the automotive vehicle is required to decrease the carbon dioxide emission in order to suppress the global warming. For these reasons, occasions when the supply of fuel to the engine is cut off in the state that the exhaust gas-purifying catalyst is heated to high temperatures are increasing.

That is, the exhaust gas-purifying catalyst is used at temperatures higher than in the past, and occasions when exposed to an atmosphere excessive in oxygen at high temperatures are increasing. For that, in order to provide the exhaust gas-purifying catalyst that delivers a sufficient performance even when used under such a condition, research and development are actively carried out.

For example, JP-A 5-168926 (KOKAI), JP-A 6-75675 (KOUHYO), and JP-A 2000-169148 (KOKAI) describe improving the heat stability of ceria to suppress the reduction in its oxygen storage capacity and the like. Specifically, JP-A 5-168926 (KOKAI) describes an exhaust gas-purifying catalyst containing an element of platinum group, activated alumina, barium compound and zirconium compound. JP-A 6-75675 (KOUHYO) describes an exhaust gas-purifying catalyst in which a catalyst-supporting layer contains cerium oxide, zirconium oxide and catalytic metal, and at least parts of cerium oxide and zirconium oxide are present as a composite oxide or a solid solution. JP-A 2000-169148 (KOKAI) describes a cerium-based composite oxide represented as the general formula:

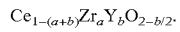

$Ce_{1-(a+b)}Zr_aY_bO_{2-b/2}$.

Further, JP-A 10-358 (KOKAI) and JP-A 2001-129399 (KOKAI) describe making platinum present as platinum composite oxide to suppress the sintering of platinum. Specifically, JP-A 10-358 (KOKAI) describes an exhaust gas-purifying catalyst using a high heat-resistant composite oxide that contains platinum and alkaline-earth metal element or one or more of group IIIA elements. JP-A 2001-129399 (KOKAI) describes an exhaust gas-purifying catalyst that includes a platinum composite oxide layer containing platinum and alkaline-earth metal element on an inorganic oxide support, in which a layer of oxide of metal X, which is at least one element selected from Mg, Ca, Sr, Ba, La and Ce, is interposed therebetween.

However, even if the stability of ceria were improved, the sintering of platinum would occur when the exhaust gas-purifying catalysts are exposed to an atmosphere excessive in oxygen at 1000° C. or higher, and a sufficient activity would not be achieved. Also, in order to produce platinum composite oxide with a high heat-stability, firing at high temperature is necessary. For this reason, a large majority of exhaust gas-purifying catalysts using platinum composite oxide are small in specific surface area and insufficient in activity.

BRIEF SUMMARY OF THE INVENTION

According to a first aspect of the present invention, there is provided an exhaust gas-purifying catalyst comprising a rare-earth element, an alkaline-earth element, and a precious metal, a part of the rare-earth element and a part of the alkaline-earth element forming a composite oxide, and the composite oxide and a part of the precious metal forming a solid solution.

According to a second aspect of the present invention, there is provided an exhaust gas-purifying catalyst comprising a support made of a rare-earth oxide, a composite oxide of a rare-earth element and an alkaline-earth element partially covering a surface of the support, and a precious metal supported by the support, wherein the rare-earth element forming the composite oxide is the same as a rare-earth element forming the rare-earth oxide, a part of the precious metal is located on the support, and another part of the precious metal and the composite oxide form a solid solution.

DETAILED DESCRIPTION OF THE INVENTION

Figure 1:
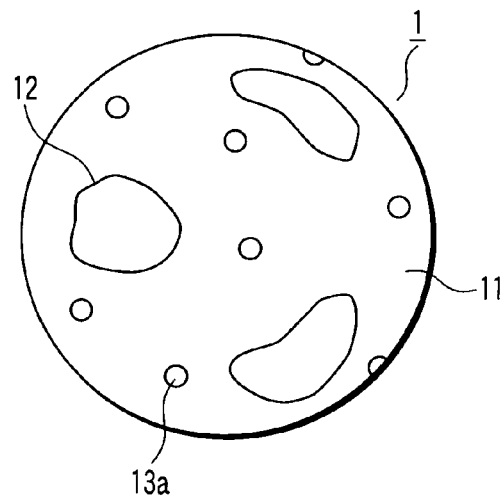
FIG. 1 is a view schematically showing an exhaust gas-purifying catalyst according to an embodiment of the present invention.

FIG. 1 is a view schematically showing an exhaust gas-purifying catalyst according to an embodiment of the present invention. The exhaust gas-purifying catalyst 1 is a pellet catalyst formed by agglomerating particles, and one of the particles is shown in FIG. 1.

The exhaust gas-purifying catalyst 1 includes a support 11, a composite oxide 12 partially covering the surface thereof, and a precious metal 13a supported by the support 11.

The support 11 contains a rare-earth oxide as a main component, while the composite oxide 12 contains a composite oxide of a rare-earth element and an alkaline-earth element as a main component. The rare-earth element forming the composite oxide 12 is the same as the rare-earth element forming the support 11. The composite oxide 12 further contains the same precious metal as the precious metal 13a to form a solid solution.

Here, as an example, it is assumed that the support 11 is made of ceria ($CeO_2$), the composite oxide 12 is made of the composite oxide represented by the chemical formula: $BaCeO_3$, and precious metal contained in the composite oxide and the precious metal 13a are platinum. That is, it is assumed that cerium is used as the rare-earth element, barium is used as the alkaline-earth element, and platinum is used as the precious metal. Note that the solid solution of the composite oxide and platinum can be represented by the chemical formula: $Ba(Ce,Pt)O_3$ and/or $(Ba,Pt)CeO_3$.

The exhaust gas-purifying catalyst 1 exhibits a reversible change in state when a composition of an atmosphere is changed under high temperature conditions. This will be described with reference to FIG. 2.

Figure 2:
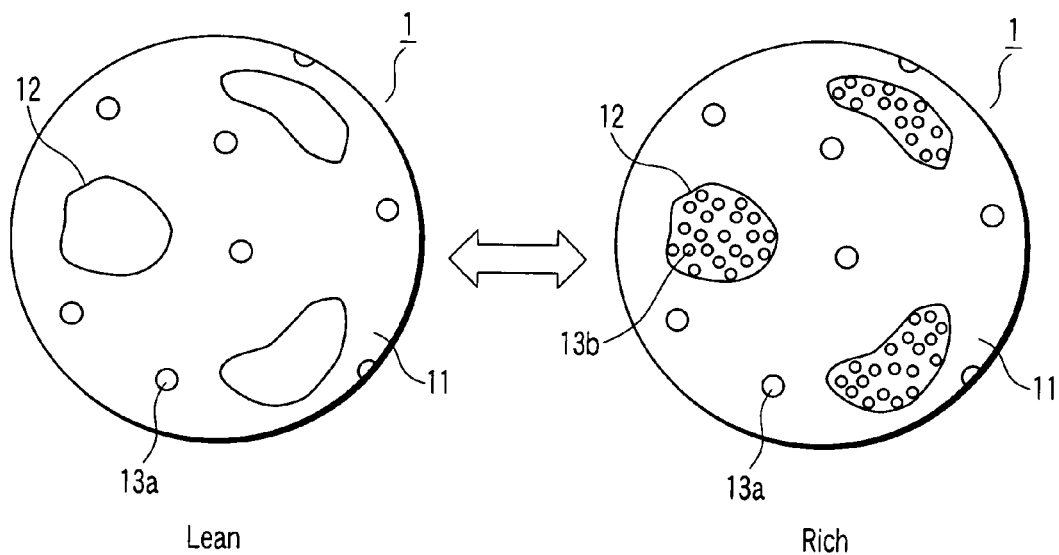
FIG. 2 is a conceptual view schematically showing a state change that the exhaust gas-purifying catalyst shown in FIG. 1 exhibits under high temperature conditions.

FIG. 2 is a conceptual view schematically showing a state change that the exhaust gas-purifying catalyst shown in FIG. 1 exhibits under high temperature conditions. In FIG. 2, the state indicated as "Lean" shows the state that the exhaust gas-purifying catalyst 1 exhibits when exposed to an atmosphere with a high oxygen concentration under high temperature conditions, for example, when the fuel supply to an engine is cut off. The state indicated as "Rich" shows the state that the exhaust gas-purifying catalyst 1 exhibits when exposed to an atmosphere with a low oxygen concentration under high temperature conditions, for example, when an abundance of fuel is continuously supplied to an engine.

The state indicated as "Lean" in FIG. 2 corresponds to the state described with reference to FIG. 1. Here, at least a part of the precious metal 13a may be oxidized; in other words, its oxidation number may be increased.

In this state, the precious metal 13a contributes to the activity of the exhaust gas-purifying catalyst 1, while platinum in the composite oxide 12 hardly contributes to the activity. However, during the period over which the exhaust gas-purifying catalyst 1 is in the state indicated as "Lean", a concentration of offensive components such as nitrogen oxides, carbon monoxide, hydrocarbons, and the like in the exhaust gas, that is, an offensive component concentration in an atmosphere is relatively low. Thus, the exhaust gas-purifying catalyst 1 delivers a sufficient performance.

When the oxygen concentration in the atmosphere is lowered under high temperature conditions, the exhaust gas-purifying catalyst 1 causes a change from the state indicated as "Lean" to the state indicated as "Rich". Specifically, platinum is precipitated out of the composite oxide, and the precipitated platinum forms the precious metal 13b on the surface of the composite oxide 12.

During the period over which the exhaust gas-purifying catalyst 1 is in the state indicated as "Rich", the offensive component concentration in the exhaust gas is relatively high. That is, during the period corresponding to the state indicated as "Rich", the exhaust gas-purifying catalyst 1 is required to be higher in activity as compared to the period corresponding to the state indicated as "Lean".

The precious metal 13b is much smaller in size than the precious metal 13a. For example, the size of the precious metal 13a is several nanometers, while the size of the precious metal 13b is equal to or less than about 1 nm. Thus, the exhaust gas-purifying catalyst 1 in the state indicated as "Rich" is higher in activity than the exhaust gas-purifying catalyst 1 in the state indicated as "Lean". Therefore, the exhaust gas-purifying catalyst 1 delivers a sufficient performance even when the offensive component concentration in the exhaust gas is high.

The exhaust gas-purifying catalyst 1 in the state indicated as "Rich" causes a change to the state indicated as "Lean" when the oxygen concentration in the atmosphere increases under high temperature conditions. That is, platinum forming the precious metal 13b and the composite oxide form the solid solution. Note that platinum and ceria hardly form a solid solution.

As described above, the exhaust gas-purifying catalyst 1 causes a reversible change in state. In addition, the exhaust gas-purifying catalyst 1 forms the ultrafine precious metal 13b on the surface of the composite oxide 12 every time it causes the change from the state indicated as "Lean" to the state indicated as "Rich". Therefore, this state is recovered by the change from the state indicated as "Rich" to the state indicated as "Lean" and its reverse change. Since an automotive vehicle changes the oxygen concentration in the exhaust gas at relatively close intervals, the exhaust gas-purifying catalyst 1 always exhibits a high activity to deliver a sufficient performance when exposed to a low oxygen concentration atmosphere at high temperatures.

Also, in the exhaust gas-purifying catalyst 1, the precious metal 13a contributes to the activity of the exhaust gas-purifying catalyst 1 regardless of the composition of the atmosphere and temperature. Therefore, the exhaust gas-purifying catalyst 1 delivers a sufficient performance not only when exposed to a high oxygen concentration atmosphere at high temperatures, but also when used for the first time or used under low temperature conditions.

Further, when the oxygen concentration in the atmosphere is increased under high temperature conditions, the exhaust gas-purifying catalyst 1 makes the precious metal 13b and the composite oxide form the solid solution as described above. Thus, the exhaust gas-purifying catalyst 1 is low in the evaporation loss of platinum in the high oxygen concentration atmosphere.

Although the case where cerium is used as the rare-earth element is described as an example, other elements may be used as the rare-earth element. For example, praseodymium and the like may be used.

Also, as the alkaline-earth element, elements other than barium may be used. For example, strontium, calcium, magnesium and the like may be used.

Further, as the precious metal, elements other than platinum may be used. For example, platinum group elements such as palladium and rhodium may be used.

In the exhaust gas-purifying catalyst 1, the atomic ratio of alkaline-earth element with respect to rare-earth element is set, for example, within a range from 1 atomic % to 80 atomic %, and typically within a range from 10 atomic % to 50 atomic %. In the case where the atomic ratio of alkaline-earth element with respect to rare-earth element is small, the volume ratio of the composite oxide 12 with respect to the support 11 is small. Thus, the recovery in performance of the exhaust gas-purifying catalyst 1 caused by the composition fluctuation of the atmosphere may be insufficient. In the case where the atomic ratio of alkaline-earth element with respect to rare-earth element is excessively large, oxidation, that is, increase of oxidation number of precious metal may be less prone to occur when the oxygen concentration in the atmosphere is increased at high temperatures. Thus, in this case, production of the solid solution of precious metal and composite oxide may be less prone to occur when the oxygen concentration in the atmosphere is increased at high temperatures, and as a result, the sintering of precious metal may be prone to occur.

The precious metal content of the exhaust gas-purifying catalyst 1 is set, for example, within a range from 0.01% to 10% by weight, and typically within a range from 0.1% to 5% by weight. When the precious metal content is small, a sufficient catalytic activity may not be achieved. When the precious metal content is large, the sintering of precious metal may be prone to occur.

The ratio of the precious metal forming the solid solution with respect the whole precious metal supported by the exhaust gas-purifying catalyst 1, which is referred to as a solid solution formation ratio hereinafter, is set, for example, within a range from 10% to 80%. When the solid solution formation ratio is small, the effect of suppressing the decrease in activity due to the sintering of precious metal may be insufficient. When the solid solution formation ratio is large, the initial activity may be insufficient.

The exhaust gas-purifying catalyst 1 can be manufactured, for example, by the following method.

First, a powdery support 11 containing a rare-earth oxide as a main component is prepared, and is made into slurry. Here, as the dispersion medium, water is used, for example. Then, a solution of precious metal salt is added to the slurry, and the resultant mixture is filtrated. Thereafter, drying and firing of the filter cake are carried out sequentially. In this way, the precious metal is supported by the support 11.

Next, the support 11 supporting the precious metal is added to a solution of alkaline-earth salt. Then, the slurry is heated so as to sufficiently remove liquid. Thus, the alkaline-earth element is supported by the support 11.

The method of making the support 11 support the alkaline-earth element is not limited. For example, a method that the support 11 supporting the precious metal is impregnated with the solution of the alkaline-earth salt, a method utilizing coprecipitation, a method using an alkoxide of alkaline-earth metal, and the like may be used.

Then, the support 11 supporting the precious metal and the alkaline-earth element is fired in an oxidizing atmosphere. Thus, the composite oxide of rare-earth element and alkaline-earth element and the solid solution of the composite oxide and the precious metal are produced so as to obtain the particles shown in FIG. 1.

Further, the powder after firing is subjected to compression-molding, and if necessary, the molded product is crushed. The exhaust gas-purifying catalyst 1 in the form of pellets is obtained by the above method.

In this method, the firing temperature is set, for example, within a range from about 700° to about 1,100° C. When the firing temperature is low, production of the composite oxide is difficult. When the firing temperature is high, the specific surface area of the support 11 decreases, and therefore, it becomes difficult to satisfactorily distribute the precious metal 13*a* over the support 11. As a result, a high activity may not be obtained.

Although the case where the exhaust gas-purifying catalyst 1 is a pellet catalyst is described as an example, the exhaust gas-purifying catalyst 1 may take various forms. For example, the exhaust gas-purifying catalyst may be a monolith catalyst.

Examples of the present invention will be described below.

EXAMPLE 1

50 g of ceria powder having a specific surface area of 160 $m^2/g$ was weighed and added into 500 mL of ion-exchanged water. After the ceria powder was well dispersed in the ion-exchanged water by 10 minutes of ultrasonic agitation, a solution of dinitrodiamine platinum nitrate was added to the slurry. The concentration and amount of the dinitrodiamine platinum nitrate solution were adjusted such that the platinum content in the exhaust gas-purifying catalyst as the final product would be 1% by weight.

After that, the slurry was filtrated under suction. The filtrate was subjected to inductively coupled plasma (ICP) spectrometry. As a result, it was revealed that the filter cake contained almost the entire platinum in the slurry.

Next, the filter cake was dried at 110° C. for 12 hours. Then, it was calcined at 500° C. in the atmosphere. Thus, platinum was supported by ceria.

Subsequently, barium acetate was dissolved into 200 mL of ion-exchanged water. Then, 50 g of the ceria supporting platinum was weighed and added into the barium acetate solution. Note that the concentration of the barium acetate solution was adjusted such that the atomic ratio of barium with respect to cerium in the exhaust gas-purifying catalyst as the final product would be 30 atomic %.

Then, the slurry was heated so as to remove the excess water. Next, it was fired at 900° C. for 3 hours in the atmosphere. Thus, a composite oxide of cerium and barium was produced on a part of the ceria surface, and a solid solution of the composite oxide and platinum was produced.

A part of the powder thus obtained was taken and immersed for 12 hours in a 10% aqueous hydrogen fluoride held at room temperature. Note that this condition allowed only the composite oxide of the powder to be dissolved. Subsequently, the solution was filtrated, and the filtrate was subjected to ICP spectrometry. As a result, the platinum content of the filtrate revealed that 70% of platinum formed the solid solution, in other words, the solid solution-forming ratio was 70%.

After that, the powder was compression-molded. The molded product was crushed so as to obtain an exhaust gas-purifying catalyst in the form of pellets with a particle diameter of about 0.5 mm to about 1.0 mm.

EXAMPLE 2

An exhaust gas-purifying catalyst was manufactured by the same method as described in Example 1 except that the concentration and amount of the barium acetate solution were adjusted such that the atomic ratio of barium with respect to cerium in the final product would be 10 atomic %.

In this example, the platinum content and the solid solution-forming ratio were determined by the same method as described in Example 1. As a result, the platinum content was 1% by weight, and the solid solution-forming ratio was 40% in this example.

EXAMPLE 3

An exhaust gas-purifying catalyst was manufactured by the same method as described in Example 1 except that the concentration and amount of the barium acetate solution were adjusted such that the atomic ratio of barium with respect to cerium in the final product would be 50 atomic %.

In this example, the platinum content and the solid solution-forming ratio were determined by the same method as described in Example 1. As a result, the platinum content was 1% by weight, and the solid solution-forming ratio was 35% in this example.

Comparative Example

An exhaust gas-purifying catalyst was manufactured by the same method as described in Example 1 except that the steps from the addition of ceria into the barium acetate solution to the subsequent firing were omitted.

In this example, the platinum content was determined by the same method as described in Example 1. As a result, the platinum content was 1% by weight in this example.

Next, the endurance of these exhaust gas-purifying catalysts was tested by the following method.

First, each exhaust gas-purifying catalyst was set in a flow-type endurance test apparatus, and a gas containing nitrogen as a main component was made to flow through the catalyst bed at a flow rate of 100 mL/minute for 20 hours. The temperature of the catalyst bed was held at 1,000° C. As the gas made to flow through the catalyst bed, a lean gas prepared by adding oxygen to nitrogen at a concentration of 5% and a rich gas prepared by adding carbon monoxide to nitrogen at a concentration of 10% were used, and these gases were switched at intervals of 5 minutes.

Next, each exhaust gas-purifying catalyst was set in an atmospheric fixed bed flow reactor. Then, the temperature of the catalyst bed was raised from 100° to 500° C. at the temperature increase rate of 12° C./minute and the exhaust gas-purifying ratio was continuously measured while a model gas was made to flow through the catalyst bed. As the model gas, the gas containing equivalent amounts of oxidizing components (oxygen and nitrogen oxides) and reducing components (carbon monoxide, hydrocarbons and hydrogen), which were adjusted stoichiometrically, was used. The results were shown in the table below.

lower temperatures as compared to the exhaust gas-purifying catalyst according to Comparative example. This result revealed that the exhaust gas-purifying catalysts according to Examples 1 to 3 were excellent in endurance as compared to the exhaust gas-purifying catalyst according to Comparative example.

Next, the exhaust gas-purifying catalyst according to Example 1 was set in the flow-type endurance test apparatus again, and the lean gas was made to flow therethrough. Then, the gas made to flow through the catalyst bed was switched from the lean gas to the rich gas. Note that the temperature of the catalyst bed was held at 1,000° C. Thereafter, the temperature of the catalyst bed was lowered while the rich gas was kept flowing through the catalyst bed. After the temperature of the catalyst bed was lowered sufficiently, the exhaust gas-purifying catalyst was observed by a transmission electron microscope (TEM). The TEM image is shown in FIG. 3.

Figure 3:
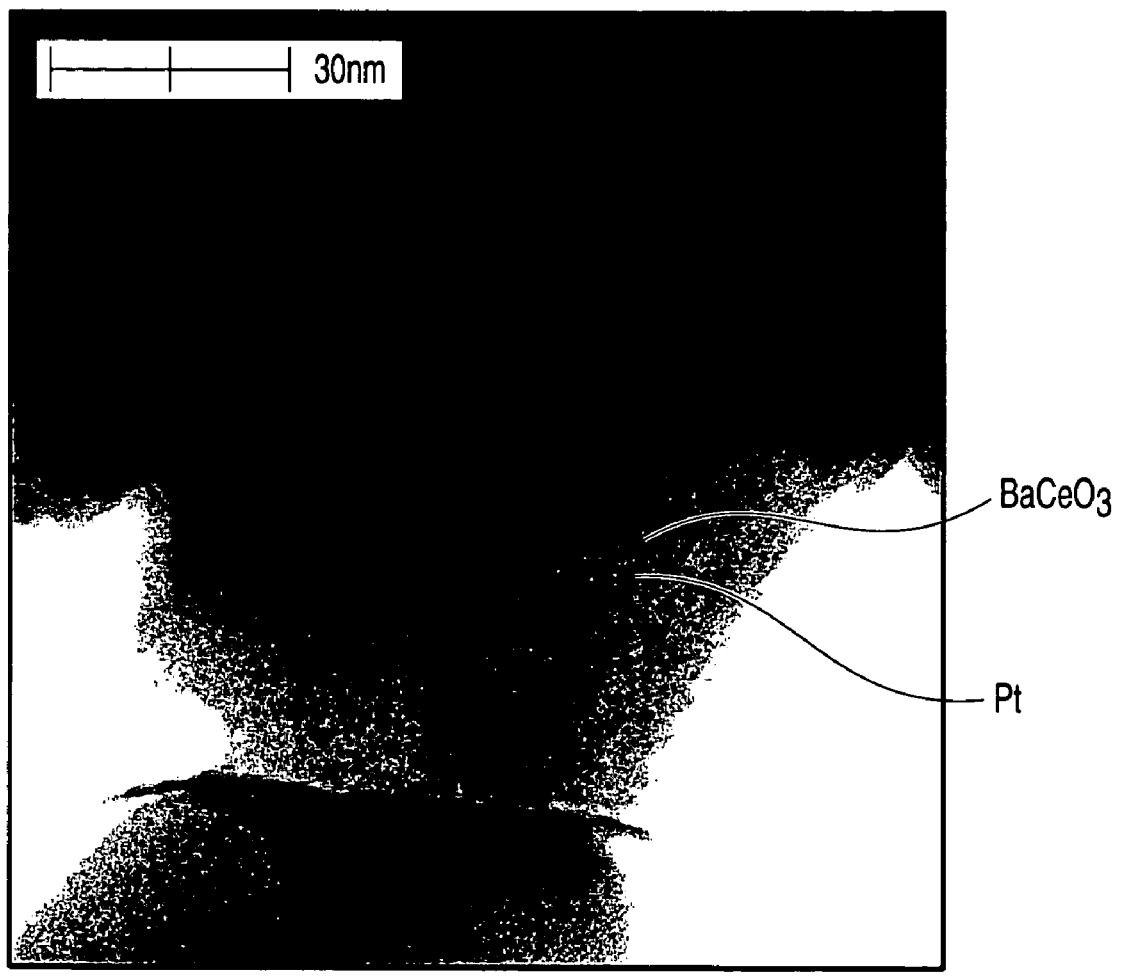
FIG. 3 is a TEM photograph of an exhaust gas-purifying catalyst according to Example 1.

FIG. 3 is a TEM photograph of the exhaust gas-purifying catalyst according to Example 1. As shown in FIG. 3, many platinum (Pt) precipitates were formed on the composite oxide ($BaCeO_3$). The size of the platinum precipitates was about 1 nm or less. Thus, when the gas made to flow under high temperature conditions was switched from the lean gas to the rich gas, the exhaust gas-purifying catalyst according to Example 1 produced many ultrafine platinum precipitates on the composite oxide.

After that, the exhaust gas-purifying catalyst according to Example 1 was set in the flow-type endurance test apparatus, and the above lean gas was made to flow through the catalyst bed while the catalyst bed was held at 1,000° C. Then, the temperature of the catalyst bed was lowered while the lean gas was kept flowing through the catalyst bed. After the temperature of the catalyst bed was lowered sufficiently, the measurement of diffraction spectrum utilizing an X-ray diffractometer was carried out on the exhaust gas-purifying catalyst.

Next, this exhaust gas-purifying catalyst was set in the flow-type endurance test apparatus, and the above rich gas was made to flow through the catalyst bed while the catalyst

TABLE 1

| | Composition of catalyst | | | | 50% purifying temperature (° C.) | | |
|---|---|---|---|---|---|---|---|
| | Ce (atomic %) | Ba (atomic %) | Pt (atomic %) | Solid solution-forming ratio (%) | HC | CO | $NO_x$ |
| Example 1 | 100 | 30 | 1 | 70 | 302 | 214 | 361 |
| Example 2 | 100 | 10 | 1 | 40 | 317 | 235 | 380 |
| Example 3 | 100 | 50 | 1 | 35 | 315 | 234 | 378 |
| Comparative example | 100 | 0 | 1 | 0 | 337 | 258 | 405 |

In the above table, "Ba (atomic %)" indicates the atomic ratio of barium with respect to cerium in the exhaust gas-purifying catalyst. "Pt (%)" indicates the weight ratio of platinum with respect to the exhaust gas-purifying catalyst. "50% purifying temperature (° C.)" indicates the lowest temperature of the catalyst bed at which 50% or more of each component contained in the model gas was purified. "HC", "CO" and "$NO_x$" indicate hydrocarbons, carbon monoxide and nitrogen oxides, respectively.

As shown in the table, the exhaust gas-purifying catalysts according to Examples 1 to 3 could purify the model gas at bed was held at 1,000° C. Then, the temperature of the catalyst bed was lowered while the rich gas was kept flowing through the catalyst bed. After the temperature of the catalyst bed was lowered sufficiently, the measurement of diffraction spectrum utilizing the X-ray diffractometer was carried out on the exhaust gas-purifying catalyst.

Further, this exhaust gas-purifying catalyst was set in the flow-type endurance test apparatus, and the above lean gas was made to flow through the catalyst bed while the catalyst bed was held at 1,000° C. Then, the temperature of the catalyst bed was lowered while the lean gas was kept flowing through the catalyst bed. After the temperature of the catalyst bed was lowered sufficiently, the measurement of diffraction spectrum utilizing the X-ray diffractometer was carried out on the exhaust gas-purifying catalyst.

Figure 4:
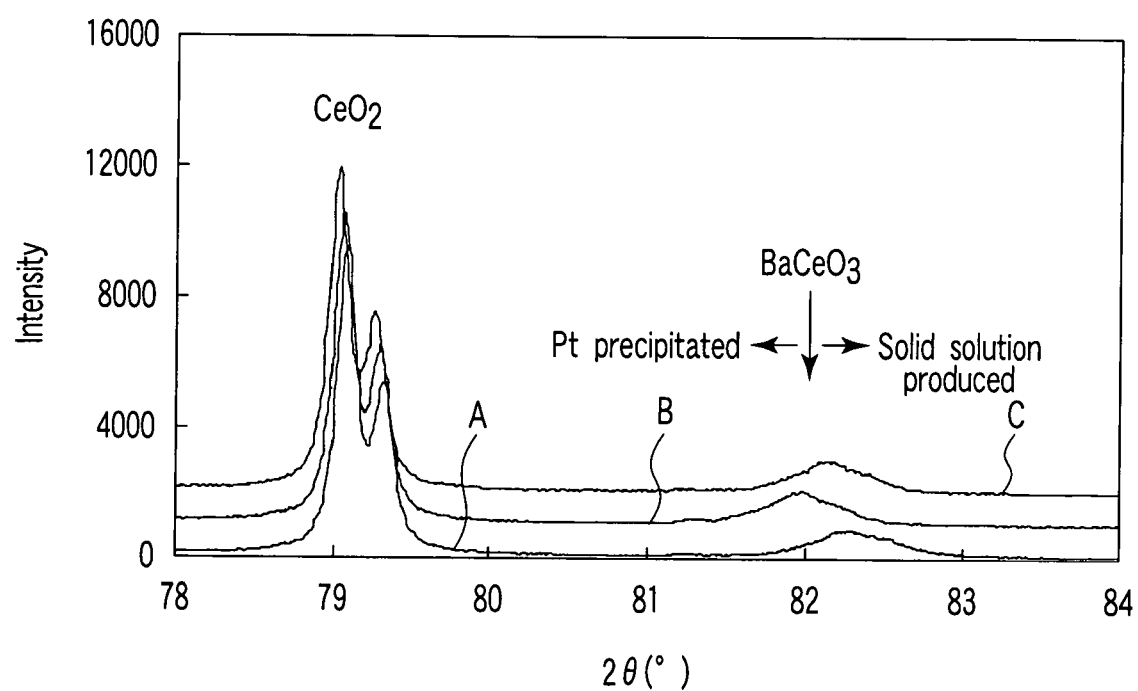
FIG. 4 is a graph showing a change in X-ray diffraction spectrum associated with a change in composition of an atmosphere obtained on the exhaust gas-purifying catalyst according to Example 1.

FIG. 4 is a graph showing a change in X-ray diffraction spectrum associated with a change in composition of an atmosphere obtained on the exhaust gas-purifying catalyst according to Example 1. In the figure, the abscissa denotes the diffraction angle, while the ordinate denotes the detected intensity. The curve A represents the diffraction spectrum just after the lean gas was made to flow for the first time, the curve B represents the diffraction spectrum just after the rich gas was made to flow, and the curve C represents the diffraction spectrum just after the lean gas was made to flow again.

As shown in FIG. 4, although the position of the peak corresponding to ceria ($CeO_2$) shifted toward the low-angle side as the number of the gas flows through the catalyst bed increased, the shift amount was nominal.

In contrast, the position of the peak corresponding to the composite oxide ($BaCeO_3$) significantly shifted toward the low-angle side when the gas made to flow was switched from the lean gas to the rich gas, and significantly shifted toward the high-angle side when the gas made to flow was switched from the rich gas to the lean gas. Further, the shift amount of the peak corresponding to the composite oxide ($BaCeO_3$) from an original position was small just after the rich gas was made to flow and was large just after the lean gas was made to flow.

This revealed that the solid solution of the composite oxide and platinum was produced when the gas made to flow was switched from the rich gas to the lean gas at high temperatures, platinum was precipitated out of the composite oxide when the gas made to flow was switched from the lean gas to the rich gas at high temperatures, and a solid solution of ceria and platinum was less prone to be produced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An exhaust gas-purifying catalyst comprising a rare-earth element, an alkaline-earth element, and a precious metal, a part of the rare-earth element and a part of the alkaline-earth element forming a composite oxide, and the composite oxide and 10% to 80% of the precious metal forming a solid solution.

2. The catalyst according to claim 1, wherein the catalyst comprises at least one of cerium and praseodymium as the rare-earth element.

3. The catalyst according to claim 1, wherein the catalyst comprises at least one element selected from the group consisting of barium, strontium, calcium and magnesium as the alkaline-earth element.

4. The catalyst according to claim 1, wherein an atomic ratio of the alkaline-earth element with respect to the rare-earth element falls within a range from 1 atomic % to 80 atomic %.

5. The catalyst according to claim 1, wherein a content of the precious metal falls within a range from 0.01% by weight to 10% by weight.

6. An exhaust gas-purifying catalyst comprising:
a support made of a rare-earth oxide;
a composite oxide of a rare-earth element and an alkaline-earth element partially covering a surface of the support; and
a precious metal supported by the support,
wherein the rare-earth element forming the composite oxide is the same as a rare-earth element forming the rare-earth oxide, a part of the precious metal is located on the support, and the composite oxide and 10% to 80% of the precious metal form a solid solution.

7. The catalyst according to claim 6, wherein the catalyst comprises at least one of cerium and praseodymium as the rare-earth element.

8. The catalyst according to claim 6, wherein the catalyst comprises at least one element selected from the group consisting of barium, strontium, calcium and magnesium as the alkaline-earth element.

9. The catalyst according to claim 6, wherein an atomic ratio of the alkaline-earth element with respect to the rare-earth element falls within a range from 1 atomic % to 80 atomic %.

10. The catalyst according to claim 6, wherein a content of the precious metal falls within a range from 0.01% by weight to 10% by weight.

11. The catalyst according to claim 1, wherein the catalyst causes a reversible change in state when an oxygen concentration of a surrounding atmosphere is changed at 1000° C., the reversible change comprising a forward change including formation of the precious metal on a surface of the composite oxide when the oxygen concentration in the surrounding atmosphere is lowered and a reverse change including formation of the solid solution when the oxygen concentration in the surrounding atmosphere is increased.

12. The catalyst according to claim 6, wherein the catalyst causes a reversible change in state when an oxygen concentration of a surrounding atmosphere is changed at 1000° C., the reversible change comprising a forward change including formation of the precious metal on a surface of the composite oxide when the oxygen concentration in the surrounding atmosphere is lowered and a reverse change including formation of the solid solution when the oxygen concentration in the surrounding atmosphere is increased.

13. The catalyst according to claim 11, wherein the size of the formed precious metal is equal to or less than 1 nm.

14. The catalyst according to claim 12, wherein the size of the formed precious metal is equal to or less than 1 nm.

15. The catalyst according to claim 1, wherein the catalyst includes particles consisting essentially of the rare-earth element, the alkaline-earth element, the precious metal, and oxygen.

16. The catalyst according to claim 6, wherein the catalyst includes particles consisting of the rare-earth element, the alkaline-earth element, the precious metal, and oxygen.

* * * * *